F. E. HUFFORD.
FRICTION CLUTCH.
APPLICATION FILED MAR. 13, 1913.

1,122,933.

Patented Dec. 29, 1914.

WITNESSES
A. J. Sacy.
C. L. Landow.

INVENTOR
Floyd E. Hufford,
his Attorney

UNITED STATES PATENT OFFICE.

FLOYD E. HUFFORD, OF MILFORD, ILLINOIS.

FRICTION-CLUTCH.

1,122,933.  Specification of Letters Patent.  Patented Dec. 29, 1914.

Application filed March 13, 1913.  Serial No. 754,028.

*To all whom it may concern:*

Be it known that I, FLOYD E. HUFFORD, a citizen of the United States, residing at Milford, in the county of Iroquois and State of Illinois, have invented certain new and useful Improvements in Friction-Clutches, of which the following is a specification.

This invention is designed as an improvement in friction clutches and as such aims to provide an efficient device in which all retarding friction in the various elements of the clutch mechanism is reduced to a minimum when the clutch is in an inoperative position.

The above and additional objects are accomplished by such means as are illustrated in the accompanying drawings, described in the following specification and then more particularly pointed out in the claims which are appended hereto and form a part of this application.

Figure 1:
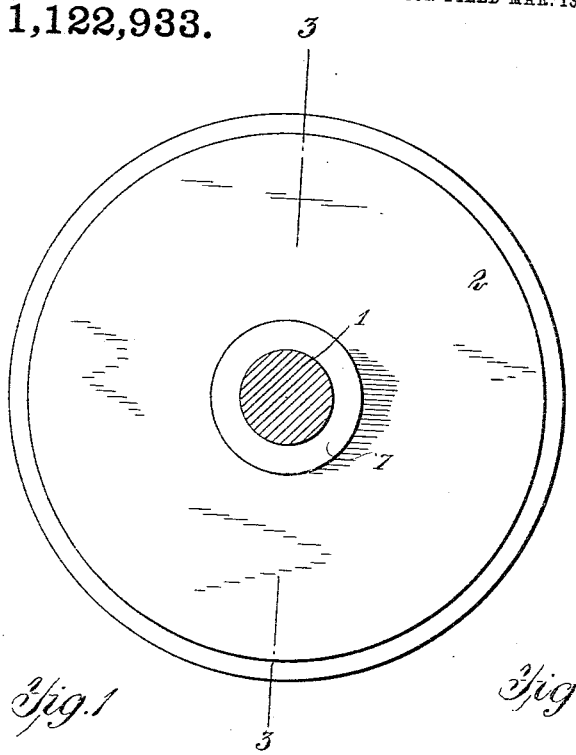
Figure 4:
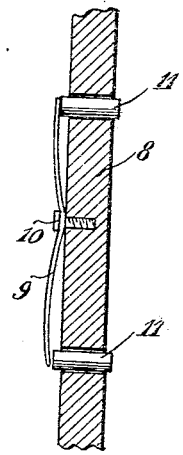
Figure 2:
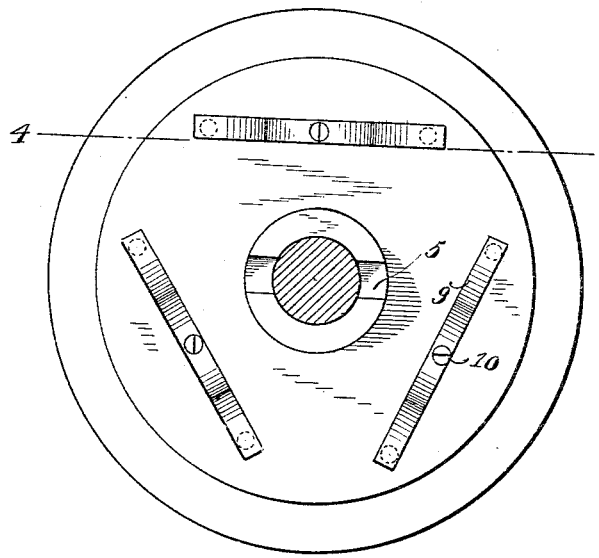
Figure 3:
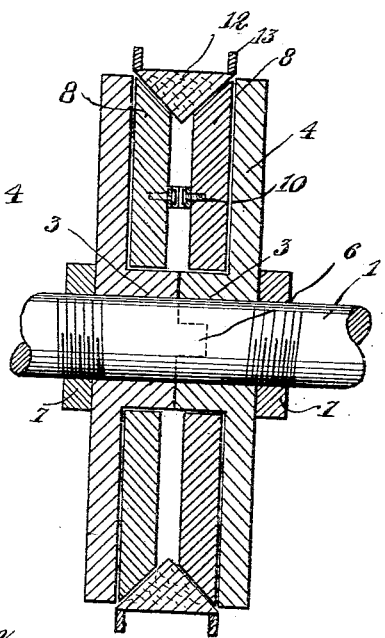

With reference to the drawings, wherein, I have illustrated the preferred embodiment of my invention as it is reduced to practice, and throughout the several views of which, similar reference numerals designate corresponding parts: Figure 1 is a side elevation of the clutch. Fig. 2 is a section taken through the clutch in a horizontal plane midway between the two side faces of the device. Fig. 3 is a section on the line 3—3 of Fig. 1. Fig. 4 is a section on the line 4—4 of Fig. 2.

Before taking up the description of the drawings, I wish to emphasize the fact that while I have designed this invention with particular reference to the requirements of a motorcycle, it may, nevertheless, be efficiently applied to any other structure vehicle or otherwise in which it is desirable to employ clutch mechanism.

Proceeding now to the description of the drawings, the numeral 1 designates a rotatable shaft of any nature on which is mounted the clutch designated as an entirety in Fig. 1 by the numeral 2.

The clutch box is formed in two homogeneous sections, each of which includes a boss member 3 and an annular laterally extending flange or plate 4 formed integrally with the hubs at one end thereof. In assembled position on the shaft 1, the hubs are so disposed that the plates 4 are on the outside in each instance leaving a disk receiving annular chamber between the flanges.

The contacting faces of the hubs 3 are provided with interlocking tongue and groove connection as at 5 in Fig. 2 and further disclosed in assembled position by dotted lines at 6 of Fig. 3. The hubs 3 are maintained in assembled position indicated at Fig. 3 by the lock nuts 7 oppositely screw threaded on the shaft 1.

Within the annular chamber formed between the flanges are loosely mounted the annular frusto-conical expanding disks 8 mounted in assembled position with their smaller faces opposed. On the smaller face of each of the disks 8 are mounted a plurality of leaf springs 9 held in the desired position by screws 10 or other suitable fasteners, and preferably disposed on the face of the disk to lie as chords of the circumference thereof. The disks are formed with a plurality of pin receiving bores in which are seated the pin members 11 arranged to bear against the free end of the spring 9 for a purpose to be hereinafter disclosed. These pin members 11 are slightly greater in length than the cross sectional dimension of the disks.

A loose pulley or wedge ring 12 which is substantially triangular in cross section and carries a pair of circumferentially extending belt retaining flanges 13 is mounted with the apex portion in engagement with the apex portion of the V shaped circumferentially extending channel formed by the convergent sides of the disks 8.

As regards the function of the springs 9 and pins 11, it will be noted that the disks 8 are preferably formed so that they do not occupy the entire space between the flanges, this construction being desirable since it will permit the upstanding disks to idle when the clutch is open and will prevent any great amount of friction between the flanges and the said disks. However, it has been found that even though the disks do not occupy the entire space between the flanges, the amount of friction resultant from the rotation of the clutch box was great enough to render the mechanism ineffective and with a view of eliminating this difficulty I have provided the spring pressed pins 11.

It will be noted that since the leaf springs 9 are secured to the disks 8, that in pressing against the pins 11 they will normally hold the disks out of engagement with the faces of the flanges 4, with the result that during the idling of the disk there is no friction within the box whatever except the small amount produced by the contact of the ends of the pins 11 with the rotating flanges 4.

The actual construction and utility of the several parts of the device being thus disclosed, it now remains to describe the operation of the clutch. Briefly it is as follows: The belt which for the sake of preventing complication of the drawings is not disclosed, is slipped on the loose pulley 12 and operatively connected to the drive or driven shaft as the case may be. It is to be presumed in this connection that the belt is provided with a tightening device. When the operator desires to throw the clutch in, he merely tightens the drive belt with the result that the loose pulley 12 is forced between the disks 8, separating these members against the action of the spring 9 and resultantly forcing their outer faces into severe frictional engagement with the opposed faces of the flange 4. When the belt tightener is released, the springs 9 bearing against the pins 11 will force the disks away from the flanges and the disks will then idle on the hubs 3 until the belt is again tightened.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:

1. The combination with a shaft of a friction clutch, said clutch including a pair of clutch plates rigidly mounted upon the shaft in spaced relation to each other, a pair of loosely mounted disk members arranged between the said clutch plates, means carried by said disk members for yieldably holding the same in spaced relation to said clutch plates and means for separating the said disks to bring them into engagement with the adjacent surfaces of the clutch plates.

2. The combination with a shaft of a friction clutch including a pair of clutch plates rigidly mounted upon said shaft in spaced relation to each other, a pair of frusto-conical centrally apertured clutch disks loosely mounted between the said clutch plates with their apex faces opposed, and a ring wedge disposed to separate the said disks thus bringing their base faces into frictional engagement with the adjacent surfaces of the clutch plates.

3. A friction clutch including a pair of circular clutch plates, a pair of boss members formed integrally with and disposed centrally of the said clutch plates, a pair of frusto-conical centrally apertured disk members loosely mounted for free rotations on the said boss members, said boss members producing a connecting hub for said plates, said disk members being arranged with their apex faces opposed, a ring wedge mounted in circumferential engagement with the said disks and adapted when under pressure to separate the said disks bringing their base portions in engagement with the adjacent faces of the clutch plates, and a pair of circumferentially extending peripherally disposed flanges carried by the said ring wedge.

4. A friction clutch including a pair of clutch plates, a pair of boss members formed integrally and arranged centrally of said plates, said plates and boss members being centrally apertured to receive a shaft, said plate members being mounted on the shaft when in assembled position so that the boss members produce a connecting hub between the said plate members, a pair of frusto-conical centrally apertured disks loosely mounted for free rotation on the said hub, said disk members being arranged with their apex faces opposed, a ring wedge mounted in circumferential engagement with the said disk members, and means carried by the said disks for normally holding the disks in spaced relation to the said clutch plates.

5. The combination with a shaft of a friction clutch including a pair of rigidly mounted clutch plates carried on said shaft, a pair of frusto-conical disks arranged between said clutch plates and provided with apertures, a ring wedge circumferentially mounted on the said disks, and means carried by the said disks for normally holding them in spaced relation to the said clutch plates, said means including a plurality of laterally disposed spacing pins operating through the apertures provided in the said disks, and a plurality of spring members carried on the apex faces of the said disks and adapted to engage the said pin members.

6. A friction clutch including a pair of clutch plates mounted in spaced relation on a suitable shaft, a pair of lock nuts for holding the said plates in assembled position, a pair of disk members loosely mounted between the said clutch plates, means for holding the said disks normally spaced from the adjacent faces of the said clutch plates, said means including a plurality of laterally disposed pins loosely seated in suitable bores provided in the said disks, and a plurality of centrally attached leaf springs, the free ends of said springs being each arranged to bear against one of said laterally disposed pin members and means for moving said disks into engagement with said clutch plates.

In testimony whereof I affix my signature in presence of two witnesses.

FLOYD E. HUFFORD.

Witnesses:
C. C. BRADFORD,
KATE K. FRAYNE.

Copies of this patent may be obtained for five cents each, by addressing the "Commissioner of Patents, Washington, D. C."